US006748230B1

(12) United States Patent
Murphy et al.

(10) Patent No.: US 6,748,230 B1
(45) Date of Patent: Jun. 8, 2004

(54) METHOD AND APPARATUS FOR UPDATING ANNOUNCEMENT GROUP INFORMATION

(75) Inventors: Helen Anne Murphy, Schaumburg, IL (US); Daniel J. McDonald, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 321 days.

(21) Appl. No.: 09/618,310

(22) Filed: Jul. 18, 2000

(51) Int. Cl.$^7$ ................................................ H04B 7/00
(52) U.S. Cl. ..................... 455/518; 455/450; 455/433; 455/520; 455/509; 455/511; 455/519; 455/426.1; 455/426.2
(58) Field of Search ............................... 455/450, 518, 455/433, 520, 509, 511, 426.1, 519

(56) References Cited

U.S. PATENT DOCUMENTS 4,972,460 A * 11/1990 Sasuta ........................ 455/519
5,564,071 A * 10/1996 Liou et al. .................. 455/520
5,956,647 A * 9/1999 McDonald et al. ......... 455/518

* cited by examiner

*Primary Examiner*—Erika Gary
*Assistant Examiner*—David Nguyen
(74) *Attorney, Agent, or Firm*—Steven R. Santema; Terri S. Hughes

(57) ABSTRACT

Method and apparatus for updating a subscriber unit with an announcement group identification. A subscriber unit (210) requests affiliation (301) with a talk group (202) and an unknown announcement group identification is issued (315) in response to the request for affiliation. The present invention includes an embodiment where information that identifies which subscriber unit (210) received the unknown announcement group signal is stored (309). An updated announcement signal is subsequently sent to the subscriber unit (210) when a zone controller (114) receives an updated announcement group identification.

13 Claims, 4 Drawing Sheets

METHOD AND APPARATUS FOR UPDATING ANNOUNCEMENT GROUP INFORMATION

BACKGROUND OF THE INVENTION

The present invention relates generally to wide area communications systems. More particularly, the present invention relates to a method and apparatus for updating announcement group information within a wide area dispatch system.

In normal processing of a wide area trunked system, communication unit or radio (hereinafter referred to as a "subscriber unit") receives the announcement group ID of its affiliated talkgroup upon performing talkgroup affiliation. However, if the talkgroup to announcement group database in a zone controller is not available for use, the announcement group information cannot be delivered to the subscriber unit. For example, the talkgroup to announcement group database is not available when the database has not been configured by the zone manager. When the database has not been configured, it is not possible for the database to provide information about the announcement group. As a result, when the subscriber unit affiliates to a talkgroup and the talkgroup does not have a preconfigured announcement group, the zone controller will respond to the subscriber unit with an unknown announcement group signal (for example, Null group ID=0). Alternatively, when a site cannot communicate with the zone controller, i.e., it is in site trunking, the zone controller cannot deliver information about the announcement group to the site. A subscriber unit, therefore, may receive an unknown announcement group signal. Both of these situations are problematic because the subscriber unit may not be able to participate in calls for the announcement group that it was intended to receive.

When the zone controller database is configured or the site recovers from site trunking, current systems do not notify the subscriber unit of the updated information about the announcement group. The subscriber unit, therefore, will not be aware of the updated announcement group and will not receive calls it was intended to receive. As a result, there is a need for a method and an apparatus that detects when a subscriber unit is operating with an unknown announcement group signal and in response thereto sends a signal updating the announcement group to the subscriber unit.

DETAILED DESCRIPTION OF THE INVENTION

The present invention provides an improved method and apparatus for updating a subscriber unit with announcement group information. In processing a wide area communications system a subscriber unit will not receive announcement group identification or information when the announcement group database is not available, e.g., when the database has not been configured by the zone manager or the site is in site trunking and cannot communicate with the zone controller.

The present invention is directed to a method and apparatus of updating subscriber units that previously received an unknown or out of date, i.e., pre-updated, announcement group identification. The method of the present invention includes an embodiment where a subscriber unit requests affiliation with a talk group. A pre-updated announcement group identification is issued in response to the request for affiliation. Information that identifies which subscriber unit received the pre-updated announcement group signal is stored. An updated announcement signal is subsequently sent to the subscriber unit. In a first embodiment, the zone controller includes a database that determines which subscriber units have received a pre-updated announcement group identification. The zone controller requests affiliation from these subscriber units and provides an updated group announcement identification. In a second embodiment, a site includes a database that stores information that identifies which subscriber units have received a pre-updated announcement group identification. The site forwards the information that identifies the subscriber units to the zone controller. The zone controller then requests affiliation from the subscriber units and forwards an updated group announcement identification.

This invention solves the problem of having subscriber units operating within a system with a pre-updated announcement group identification. The goal of this invention is to determine which subscriber units have received a pre-updated announcement group identification and update these individuals with the correct, predefined announcement group identification.

The present invention, together with attendant objectives and advantages, will be best understood with reference to the detailed description below, read in conjunction with the accompanying drawings.

Figures 1, 2:
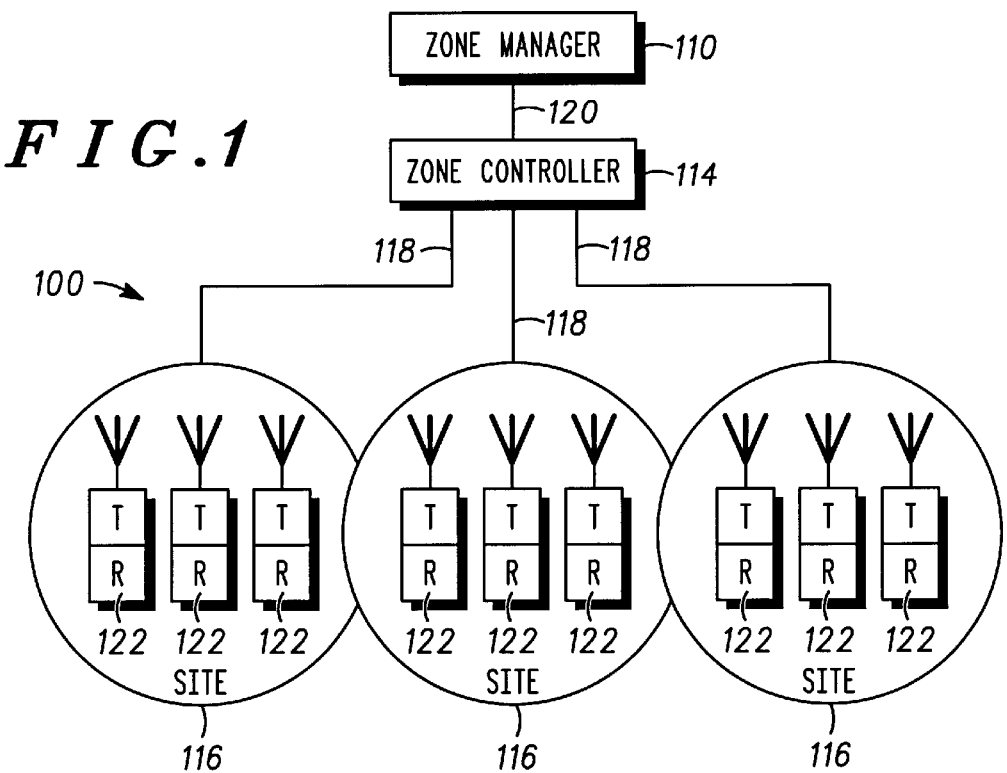
FIG. 1 is a diagram illustrating a wide area dispatch system and the relationship of a zone manager, zone controller, and a plurality of communication sites.
FIG. 2 is a diagram illustrating the relationship between announcement groups, talk groups and subscriber units.

Referring to FIG. 1, a wide area dispatch system 100 modeled on systems such as Motorola's SmartZone® and OmniLink® systems is illustrated. Generally, these systems include a central controlling element which communicates with a multitude of communication sites. With particular reference to FIG. 1, the system 100 includes a zone manager 110, a zone controller 114, and a plurality of sites 116. The zone manager 110 is responsible for configuring system parameters such as physical device configuration parameters. The zone controller 114 performs call control and mobility management for subscriber units. The zone controller 114 is coupled to the sites 116 via communication trunks 118. The zone controller 114 is connected to the zone manager via the communication trunk 120. The sites 116 provide the over-the-air signaling and are the interface point with the subscriber units. The sites 116 include a plurality of communication resources or channels 122 (generally frequencies in an FDMA, CDMA, or TDMA system) for over-the-air-communication with subscriber units.

With reference to FIG. 2, the relationship of an announcement group 200, talkgroups 202a–202c and the subscriber units 210a–210i are illustrated. Talkgroups 202a–202c are groupings of subscriber units 210, or individuals, that wish to intercommunicate. The zone manager 110 is responsible for configuring system parameters such as talkgroup 202 attributes such as priority levels and security capabilities. A subscriber unit 210 is considered a member of the talkgroup 202 when it affiliates to a particular talkgroup 202. Talkgroups 202 are grouped together in a predefined structure known as a fleet. It is possible to communicate to all subscriber units 210 in a talkgroup 202 in a common fleet. In order to communicate with the fleet members, a call is placed on a predefined talkgroup 202a–202c assigned to the fleet or, in other words, a fleetwide talkgroup. This fleetwide talkgroup is referred to as an announcement group 200.

The subscriber units 210a–210i are individual units (e.g. radios) for users that transmit and receive information such as voice and data. Subscriber units 210a–210i register at sites 116 for communication via a site 116. The subscriber units 210 are capable of (1) making individual calls on the system 100 from one subscriber unit 210 to another subscriber unit 210; (2) talkgroup calls, which are broadcast to all subscriber units 210 affiliated with a particular talkgroup 202; (3) announcement group calls, which are broadcast to all subscriber units 210 affiliated with an announcement group 200; or (4) telephone interconnect calls, which require a zone controller 114 to interconnect calls with the public switched telephone network (PSTN) through an interface (not shown).

As an exemplary grouping, in FIG. 2, subscriber units 210a–210c are shown affiliated with a first talkgroup 202a. Subscriber units 210d–210f are shown affiliated with a second talkgroup 202b. Subscriber units 210g–210i are shown affiliated with a third talkgroup 202c. The first talkgroup 202a, the second talkgroup 202b, and the third talkgroup 202c are associated with the announcement group 200.

When a site 116 is communicating with the zone controller 114 it is considered to be in wide area trunking since it has the ability to be linked to other sites 116. If a site 116 cannot communicate with the zone controller 114 for any reason, the site 116 will enter a state known as site trunking. When in site trunking, all subscriber units 210 at a site 116 can communicate only with other subscriber units 210 active at that particular site 116.

Referring again to FIG. 1, the zone controller 114 has a database that contains the relationship between announcement group 200 and the talkgroups 202. When a subscriber unit 210 affiliates to a particular talkgroup 202, it signals its individual ID and the affiliated talkgroup 202. Upon receiving this affiliation request, the zone controller 114 will examine its database to determine the announcement group 200 associated with the affiliated talkgroup 202 and respond to the affiliation request with an acknowledgement that includes the talkgroup's assigned announcement group 200. The subscriber unit 210 will then use this announcement group 200 to receive fleetwide calls.

Figure 3:
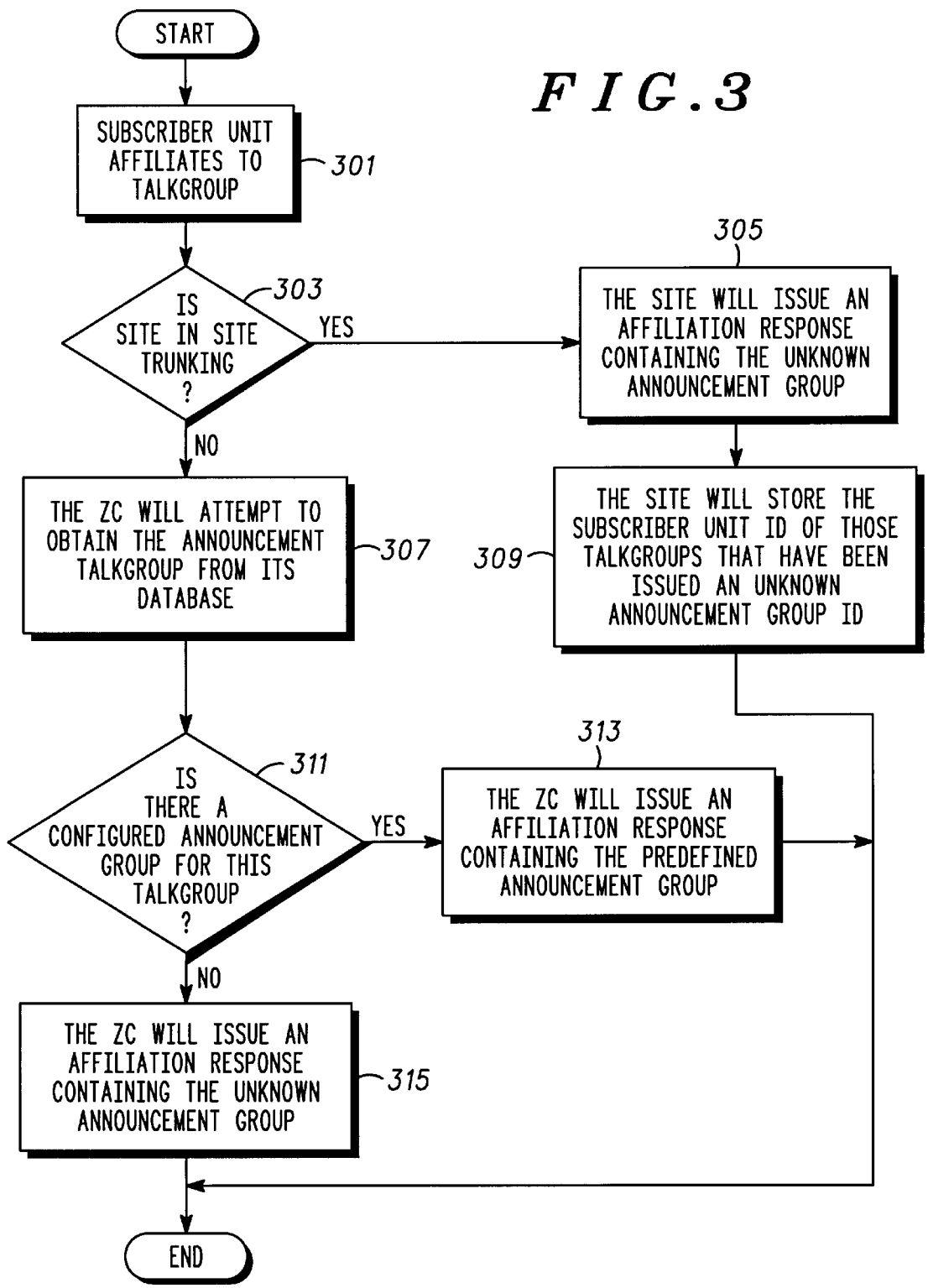
FIG. 3 is a flow diagram illustrating the operation of one embodiment of the present invention.

FIG. 3 is a flow diagram illustrating one of the embodiments of the present invention. At block 301, a subscriber unit 210 requests affiliation to a talkgroup 202. At block 303, the state of the site 116 is determined. If the site 116 is in site trunking, the site 116 will issue an affiliation response with the unknown announcement group as shown at block 305. The site 116 will then, at block 309, store in a database the subscriber unit ID as a unit that has received an unknown announcement group signal. If, at block 303, the site 116 is in wide trunking, the site 116 forwards the affiliation request to the zone controller 114. At block 307, the zone controller 114 searches its database for the proper announcement group 200. If, at block 311, the zone controller 114 cannot find the preconfigured announcement group 200 for this talkgroup 202, the zone controller 114 will then issue an affiliation response with that announcement group as indicated at block 313. If, at block 311, the zone controller 114 can find the preconfigured announcement group 200 for the talkgroup 202, the zone controller 114 will issue an affiliation response with the unknown announcement group signal as indicated at block 315.

Figure 4:
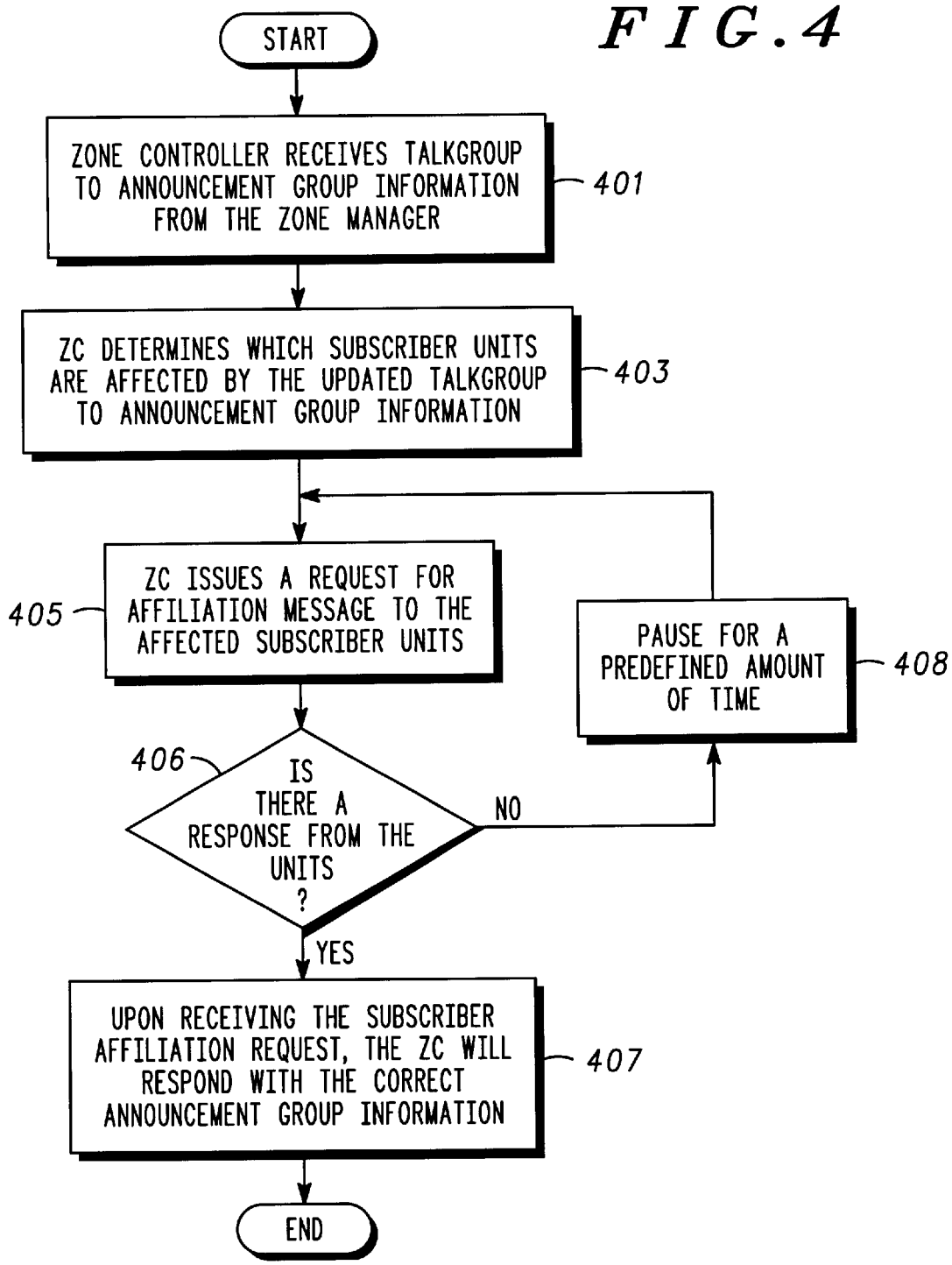
FIG. 4 is a flow diagram illustrating the operation of another embodiment of the present invention.

FIG. 4 shows how the zone controller 114 could update the subscriber units 210 which are operating with pre-updated announcement group information as a result of the talkgroup to announcement group database not being configured. Alternately, the zone manager 110 may modify or update an already valid and configured announcement group to another valid announcement group. At block 401, the zone controller 114 receives the announcement group 200 from the zone manager 210. The zone controller 114 will now know the correct updated announcement group 200 for talkgroups 202. At block 403, the zone controller 114 will determine which subscriber units 210 are affiliated to talkgroups 202 that did not previously receive an updated announcement group 200. At block 405, the zone controller 114 will issue a request for affiliation message to each of these subscriber units 210. Upon receiving the request for affiliation message, a subscriber unit 210 will send in an affiliation request. If the subscriber unit 210 does not respond (block 406), multiple requests will be made, at block 408, until the subscriber unit 210 responds. The zone controller 114 then receives the affiliation request from a subscriber unit 210 and, at block 407, sends a response back to the subscriber unit 210 with the correct announcement group information 200.

Figure 5:
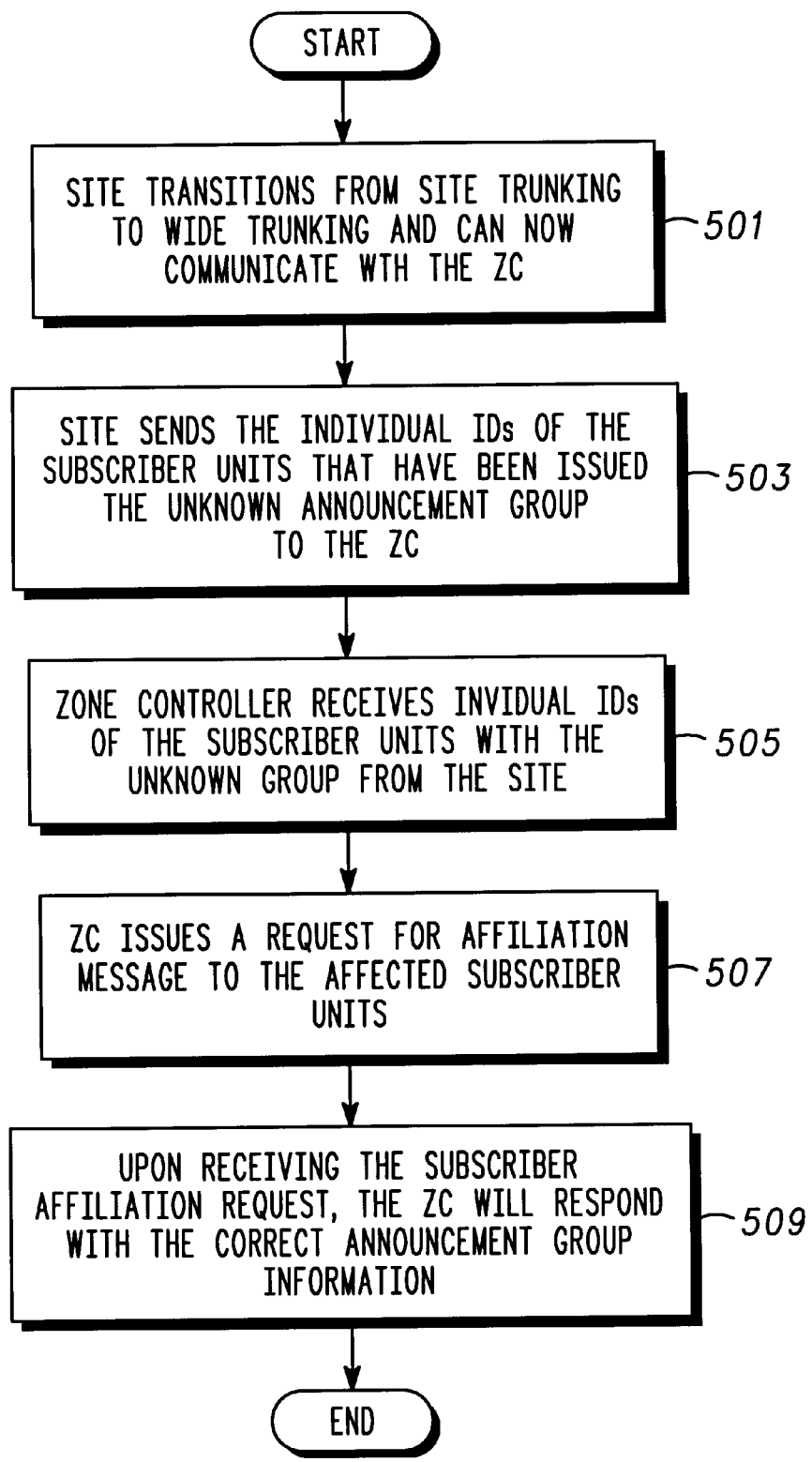
FIG. 5 is a flow diagram illustrating the operation of a further embodiment of the present invention.

FIG. 5 shows how the zone controller 114 could update the subscriber units because of a site trunking state. In this case, a site 116, while in the site trunking state, could store in a database the ID's of the subscriber units 210 that received the unknown announcement group (FIG. 3 block 309). In a preferred embodiment, when the site 116 recovers from site trunking, the site 116 could upload information to the zone controller 114. This upload information would consist of an ID of each subscriber unit 210 at the site 116 and a list of those subscriber unit IDs 210 that have received an unknown announcement group. Once the zone controller 114 receives the upload information from a site 116, the zone controller 114 could notify those subscriber units 210 with the unknown announcement group to affiliate again so that the announcement group ID could be corrected. With reference to FIG. 5, at block 501, a site 116 transitions from site trunking to wide trunking. The site 116 can now communicate with the zone controller 114 and can start to send site 116 upload information. At block 503, the site 116 sends upload information to the zone controller 114 including the ID information of the subscriber units 210 that received the unknown announcement group. Once the zone controller 114 receives this subscriber unit ID information (block 505), the zone controller 114 can then issue each of these subscriber units a request for affiliation (block 507). When a subscriber unit 210 receives the request for affiliation, the subscriber unit 210 will send in an affiliation request. At block 509, the zone controller 114 receives the affiliation request from the subscriber unit 210 and sends a response back with the correct announcement group 200.

In another embodiment directed to a situation of site trunking, in block 505, when the zone controller 114 receives the upload information from a site 116, the zone controller 114 could send a request for affiliation, at block 507, to every individual at the site 116 rather than just the individuals that receive the unknown announcement group signal. In this case, the site 116 would not need to keep track of the subscriber units 210 that were issued the unknown announcement group signal. In another embodiment, in blocks 507 and 509, the zone controller 114 could send an affiliation response with the predefined announcement group 200 to one or more subscriber units 210 without first requesting the subscriber units 210 to affiliate.

The present invention includes advantages not found in previous communications systems such as helping a subscriber unit 210 to avoid missing calls it was intended to receive. For example, the present invention provides for subscriber units 210 with the unknown announcement group to be quickly updated with the correct announcement group 200 in a timely manner without relying on the subscriber unit 210 to take an action (such as changing talkgroups 202 or sites 116). Also, the subscriber unit 210 does not have to be preprogrammed with an announcement group 200, allowing the flexibility of changing the announcement group 200 without reprogramming the subscriber unit 210. In addition, the present invention does not require a talkgroup to announcement group database at each site 116 thereby reducing the complexity of the system by keeping a distributed database up to date.

While particular embodiments of the present invention have been shown and described, modifications may be made. For example, method steps may be rearranged, substituted and deleted as appropriate. Further, structural elements may be rearranged and substitutions may be made while still providing the required function. It is therefore intended in the appended claims to cover all such changes and modifications which fall within the true spirit and scope of the invention.

We claim:

1. A method comprising the steps of:
   receiving an affiliation request from a subscriber unit while operating in a site trunking mode;
   issuing an affiliation response comprising a latest known announcement group to the subscriber unit;
   storing an identification of the subscriber unit in a database;
   uploading the identification of the subscriber unit to a first device after transitioning from the site trunking mode to a wide area trunking mode;
   after the step of uploading, issuing a request for re-affiliation to the subscriber unit;
   prior to the step of transmitting, receiving a second affiliation request from the subscriber unit; and
   transmitting an updated announcement group to the subscriber unit.

2. The method of claim 1 wherein the subscriber unit does not receive announcement group calls until the updated announcement group is received by the subscriber unit.

3. The method of claim 1 wherein the affiliation request identifies a talkgroup in which the subscriber unit is affiliated with.

4. The method of claim 3 further comprising storing relationships between talkgroups and announcement groups.

5. The method of claim 1 wherein the step of transmitting is performed upon notice that the latest known announcement group is invalid.

6. The method of claim 1 further comprising the step of receiving the updated announcement group from the first device for use by the subscriber unit.

7. The method of claim 1 wherein the first device is a zone controller.

8. A method comprising the steps of:
   receiving an affiliation request from a subscriber unit while operating in a site trunking mode;
   issuing an affiliation response comprising an unknown announcement group to the subscriber unit;
   storing an identification of the subscriber unit in a database;
   uploading the identification of the subscriber unit to a first device after transitioning from the site trunking mode to a wide area trunking mode;
   after the step of uploading, issuing a request for re-affiliation to the subscriber unit;
   prior to the step of transmitting, receiving a second affiliation request from the subscriber unit; and
   transmitting a known announcement group to the subscriber unit.

9. The method of claim 8 wherein the steps of receiving, issuing, storing and uploading are performed by a site, and wherein the step of transmitting is performed by one of the site or a zone controller.

10. The method of claim 8 further comprising the step of receiving the known announcement group from the first device.

11. The method of claim 8 wherein the first device is a zone controller.

12. A method comprising the steps of:
    receiving an affiliation request for a talkgroup from a subscriber unit;
    determining that an announcement group identification for the talkgroup is not available;
    sending an unknown announcement group identification to the subscriber unit;
    when the announcement group identification for the talkgroup becomes available, sending a request to the subscriber unit to re-request affiliation; and
    upon receipt of a second affiliation request, sending an affiliation response with a known announcement group identification to the subscriber unit.

13. The method of claim 12 further comprising the step of, in response to the step of sending an unknown announcement group identification, storing an identification of the subscriber unit in memory; and wherein the request to re-request affiliation is sent to the subscriber unit whose identification is stored in memory.

* * * * *